UNITED STATES PATENT OFFICE.

THOMAS L. WILLSON, OF LEAKSVILLE, NORTH CAROLINA.

PROCESS OF ELECTRICALLY REDUCING REFRACTORY COMPOUNDS.

SPECIFICATION forming part of Letters Patent No. 486,575, dated November 22, 1892.

Application filed April 20, 1892. Serial No. 429,923. (Specimens.)

*To all whom it may concern:*

Be it known that I, THOMAS L. WILLSON, a citizen of the United States, residing in Leaksville, in the county of Rockingham and State of North Carolina, have invented certain new and useful Improvements in Electric Smelting of Refractory Ores, of which the following is a specification.

This invention relates to the reduction of aluminium and other difficultly-reducible metals from refractory ores or compounds thereof by the process of electric smelting in the presence of a reducing agent.

Processes of smelting by electric heat are well known. In such processes an electric furnace is employed, constructed to convert the energy of an electric current into heat energy, either by interposing the resistance of a poor conductor or by the formation of an electric arc. The alumina or other metallic oxide or ore is fused and vaporized by the heat thus generated, and is brought into contact with a reducing agent within the furnace, preferably carbon or hydrocarbon, whereby the oxygen is dissociated from the metal, thereby reducing the latter to the metallic state. Ordinarily a base metal is present in the furnace to alloy with the aluminium or other metal as it is reduced from the ore.

My present invention aims to improve and perfect such processes of reduction by quickening and cheapening the process. According to my invention I bring the metallic compound in a state of extremely-fine subdivision into most intimate contact with the reducing agent before subjecting it to the electric-smelting process. By my process the alumina or other metallic compound and the carbon or other reducing agent are brought into the closest atomic proximity that is possible by mechanical means. The heat of the electric furnace is consequently rendered more effective in dissociating the oxygen by reason of the closer juxtaposition of the reducing agent to the molecules of oxide, so that the superior affinity of the reducing agent for the oxygen is made more thoroughly available for its separation from the metal.

My invention consists, essentially, in subjecting to the heating action of an electric current a metallic compound, preferably in a fine state of subdivision or pulverization and impregnated with a suitable reducing agent. Preferably the alumina or other metallic oxide, ore, or compound is reduced to a state of fine subdivision or pulverization and is treated with a hydrocarbon or other reducing agent applied in liquid or semiliquid form, so that the metallic compound shall be thoroughly impregnated therewith. Preferably heat is applied to facilitate the entrance of the reducing agent into the pores or the interstices of the minutely-divided metallic compound. In the case of a compound that is wanting in porosity or permeability it should be reduced to impalpability or to such fine subdivision that the coating of its individual particles with the reducing agent will result in a sufficient impregnation of the mass of metallic compound with the reducing agent to enable the advantages of my invention to be realized.

More specifically my invention consists in the employment of finely subdivided or pulverized and preferably porous alumina or other metallic oxide, ore, or compound, which is impregnated with a reducing agent by saturating it therewith while the reducing agent is in liquid condition. The reducing agent is preferably a hydrocarbon, and is applied by steeping the oxide or metallic compound therein until sufficient of the hydrocarbon has been absorbed thereby to enable an effective reduction to be performed. The oxide or compound is preferably stirred into the liquid hydrocarbon or other reducing agent until the liquid is all absorbed into the metallic compound, which may then be dried by evaporation or heating, leaving it impregnated or saturated with the reducing agent. In the case of a hydrocarbon which is not liquid at ordinary temperatures it is liquefied by heating before stirring in the metallic compound. Paraffine and coal-tar may thus be employed, being heated to a boiling temperature and the metallic compound stirred into the bath until as much has been introduced as will suffice to fully absorb the hydrocarbon.

A metallic compound or ore treated with a reducing agent in any of the ways thus suggested is subjected to electric smelting according to any of the well-known electric-smelting processes. In an incandescent electric furnace it should be mixed with the broken or pulverized resistance material, preferably carbon, employed in such furnaces to convert the electric energy into heat, so that upon the passage of the current through the mixture the current will be conducted by this resistance material, and by reason of the poor conductivity thereof it will be largely converted into heat, the heat thus developed being distributed throughout the mass traversed by the current, so that the intermixed impregnated metallic compound on being heated thereby will undergo a reaction, its oxygen entering into a new combination with the reducing agent and its aluminium or other metal being set free. In the case of aluminium an alloying metal may be provided in the furnace to take up the freed aluminium.

In an electric-arc furnace of ordinary construction comprising a carbon crucible or hearth connected to one electric terminal and a carbon pencil projecting into it and joined to the opposite terminal the impregnated metallic compound is introduced either before or after the setting of the furnace in operation, and may either be introduced in bulk at the outset or continuously or at intervals from time to time during the running. The heat of the electric arc acts upon the portions of metallic compound within its range and induces a reaction between the metallic oxide or other compound and the impregnated reducing agent, the latter combining with the oxygen and setting the metal free. In the reduction of aluminium in an electric furnace it is usual to provide a base metal in the furnace, which, being kept molten by the heat, takes up the aluminium as it is freed by forming an alloy therewith. If a base metal be not present, the product of the reduction will be carbide of aluminium.

My invention is not limited to any particular reducing agent, but comprehends any substance whatever that is available for the reduction of oxygen compounds by combining with the oxygen thereof. Carbon or hydrocarbons are ordinarily preferable; but I have successfully used common salt (sodium chloride) as a reducing agent, and doubtless many other substances are in greater or less degree suitable as substitutes for carbon or hydrocarbons. When sodium chloride is used in reducing alumina, it is decomposed by the heat, the chlorine escapes, and the sodium attacks the oxygen of the alumina, forming soda, and setting free the aluminium in metallic form.

The general nature and essentials of my invention being now understood, I will proceed to describe in detail the preferable mode of practicing my invention as applied to the reduction of aluminium in the making of alloys thereof from alumina.

I employ, by preference, precipitated alumina thoroughly dried. In this form the alumina is in an exceeding fine state of subdivision or pulverization, and is in a permeable or porous condition. As the reducing agent I employ coal-tar or heavy hydrocarbon oil or paraffine. Assuming that tar is used, I place it in a caldron and heat it to a boiling temperature, and while maintaining this temperature I gradually stir in the precipitated alumina until the tar is all absorbed into the alumina. I find that twenty-two pounds of alumina will thus absorb one gallon of tar. The tar-impregnated alumina is thoroughly dried by increasing the heat so as to drive off as much as possible of the moisture or volatile constituents contained in the tar, the mass being continually stirred from the time of boiling until it becomes dry. The tar-impregnated alumina then appears as a very fine black or nearly black powder. Its analysis shows 59.1 per. cent of alumina and 15.28 per cent. of carbon and hydrocarbon. The powder thus prepared is a non-conductor of electricity. In using this tar-impregnated alumina in electric smelting for the production of aluminium bronze or alloys, I proceed, preferably, as follows, using an electric-arc furnace: I place a small quantity of the base metal for the alloy, preferably granulated copper, in the bottom of the crucible of the furnace, and lower the carbon electrode into it until it touches the copper. The crucible being covered over, a current is passed through the furnace either by switching it thereinto or preferably by starting up the dynamo. As a sufficient electro-motive force is attained the carbon electrode is lifted slightly out of contact with the granulated metal, thereby forming an arc, and in the subsequent treatment the carbon pencil is kept lifted sufficiently to maintain this arc. I now introduce through the vent-opening in the top of the furnace a suitable quantity of the tar-impregnated alumina, which falls down beside the carbon pencil and into the arc, where it is immediately heated thereby to an exceedingly-high temperature. The first effect of the heat is to drive off the moisture and volatile elements of the hydrocarbon still contained in the tar-impregnated alumina. This action is shown by the black smoke that immediately issues from the vent-opening. Immediately thereafter a series of violent explosions occur within the furnace. Presumably these are due to the formation of carbon monoxide or dioxide caused by the combination of the carbon from the tar with the oxygen of the alumina—a combination which apparently takes place with great rapidity at the inconceivably-high temperature existing within the furnace. The aluminium which is thus freed is immediately alloyed with the copper, which, under the high temperature in the furnace, exists in the condition of a molten bath in a state of violent ebullition with its vapors streaming through the arc. The feeding in of the tar-impregnated alumina is kept up as long as it is desired to operate the process, granulated copper being also added from time to time, preferably in alternation with the impregnated alumina. The resulting aluminium bronze may also be tapped off from the furnace from time to time without stopping the operation.

By practicing this process I have obtained a greatly-increased output of aluminium reduced as compared with any other electric process of reduction. With the same current and under the same electro-motive force I have obtained over twice the product of reduced aluminium in a given length of time that I have been able to obtain by any other process of electric smelting of alumina. In practicing electro-thermic reduction in an arc furnace I employ no granulated or pulverized carbon within the furnace, nor is any other reducing agent introduced than that contained in the tar-impregnated alumina. The reactions in my process are more rapid and violent than in any other electric-smelting process, thereby resulting in the reduction of a greater quantity of aluminium for a given expenditure of electrical energy. I attribute this important economic advantage of my process to the fact that the alumina and the reducing agent are brought into the closest atomic proximity that is possible by mechanical means—that is to say, by any means short of affecting a new chemical combination. Thus each particle of alumina contains inseparably within itself the elements necessary for its own reduction. In this important respect my improved process differs from all processes of electric smelting or reduction heretofore practiced or suggested.

My process results in a cheaper reduction than other prior processes, not only because for a given expenditure of power the product in aluminium is more than double, but also because by my process the reducing agent costs less than three-fourths as much per pound of aluminium reduced as when pulverized carbon is employed.

The use of tar as a reducing agent is advantageous because of its cheapness; but other hydrocarbons are equally applicable. In using paraffine or any heavy hydrocarbon I proceed in the same manner as described with tar, the hydrocarbon being boiled and the alumina stirred into it. In using the lighter hydrocarbons, which are sufficiently fluid at ordinary temperatures, the boiling is unnecessary. I have used ordinary kerosene-oil as the reducing agent by simply mixing it with the alumina, so that the alumina absorbs or becomes saturated with the oil, and then feeding the oil-impregnated alumina immediately into the furnace.

In the impregnation of the alumina with a hydrocarbon the latter, I believe, permeates the pores of the minute particles of alumina, and by subsequent heating or drying the hydrocarbon is more or less distilled, the lighter hydrocarbons being cracked off and leaving a residue of precipitated carbon and of heavy hydrocarbons within and upon the particles of alumina. The reducing agent thus applied to the alumina is hence partly disseminated within its porous structure and partly applied as an exterior coating. On subjecting alumina thus treated or impregnated to the intense heat of the electric furnace the distillation of the hydrocarbon is thought to be completed at the first operation and immediately succeeded by the decomposition of the alumina, its oxygen entering into combination with the carbon and with any residue of hydrogen that may not have been expelled, thus freeing aluminium in a metallic state.

In the case of alumina in a less-porous condition than precipitated alumina the liquid reducing agent may not penetrate the substance of the alumina to any considerable extent or may, in fact, be applied only to the exterior thereof; but in such case, if the alumina shall have been reduced by grinding to an impalpable powder or otherwise sufficiently subdivided or pulverized and then introduced and soaked into the liquid-reducing agent, the coatings of reducing agent thus applied around and between the minute particles of alumina will constitute an impregnation thereof with reducing agent in the sense of my invention and to equivalent effect to the permeating of porous alumina with the reducing agent.

My invention is not limited in its application to the reduction of aluminium, but is equally applicable to other difficultly-reducible metals or ores. My present application relates to the same subject-matter of invention as my application, Serial No. 307,337, filed April 15, 1889, now involved in interference; Serial No. 386,301, filed March 25, 1891, and Serial No. 442,601, filed August 9, 1892. I make no claim in my present application to anything claimed in either of the aforesaid applications.

I claim as my invention the following defined improvements in the electric smelting or reduction of alumina or other refractory ores or compounds, substantially as hereinbefore specified, namely:

1. The process of reduction of a pulverized metallic compound, which consists in first impregnating it with a reducing agent by saturating it therewith while the latter is in liquid condition and then subjecting the impregnated compound to the heating action of an electric current.

2. The process of reduction of a pulverized metallic compound, which consists in first impregnating it with a reducing agent by boiling it therein and then subjecting the impregnated compound to the heating action of an electric current.

3. The process of reduction of a pulverized metallic oxide, which consists in first impregnating it with a reducing agent in the nature of a hydrocarbon which is liquid when heated by introducing the oxide into a heated bath of the reducing agent until sufficient of the latter has been absorbed by the metallic compound, then drying the latter by heat, and finally subjecting the impregnated compound to the heating action of an electric current.

4. The process of reduction of a pulverized metallic oxide, which consists in introducing it into boiling coal-tar, drying it by heat to expel the volatile constituents of the tar, and then subjecting the tar-impregnated oxide to electric smelting.

In witness whereof I have hereunto signed my name in the presence of two subscribing witnesses.

THOMAS L. WILLSON.

Witnesses:
J. TURNER MOREHEAD,
J. H. NANCE.